April 24, 1934. E. P. DU PONT ET AL 1,956,319
CONVERTIBLE MOTORCYCLE CHASSIS
Filed Nov. 19, 1930 2 Sheets-Sheet 1
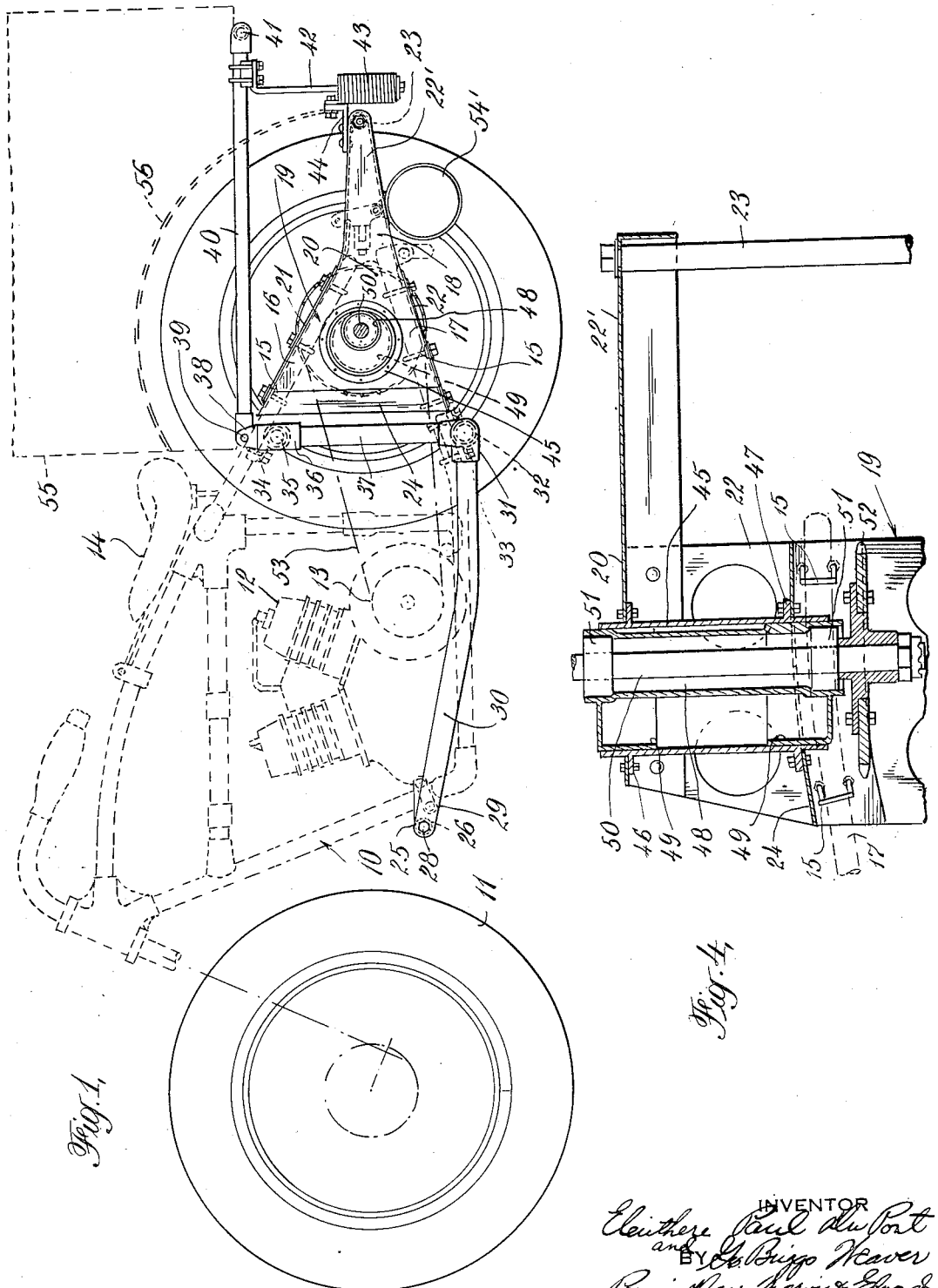

April 24, 1934.  E. P. DU PONT ET AL  1,956,319
CONVERTIBLE MOTORCYCLE CHASSIS
Filed Nov. 19, 1930   2 Sheets-Sheet 2
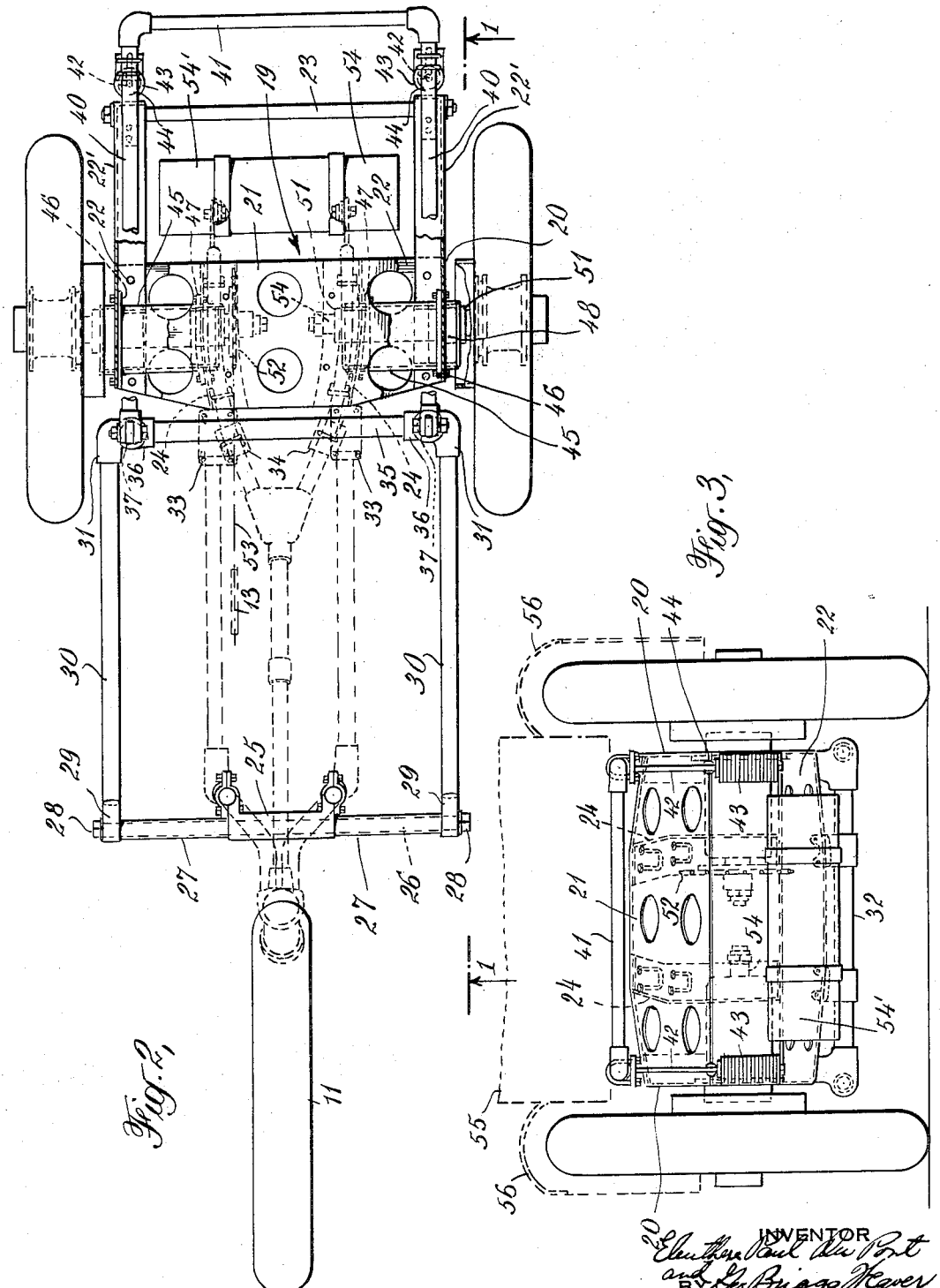

Patented Apr. 24, 1934

1,956,319

UNITED STATES PATENT OFFICE 1,956,319

CONVERTIBLE MOTORCYCLE CHASSIS

Eleuthere Paul du Pont, Wilmington, Del., and George Briggs Weaver, Springfield, Mass., assignors to Indian Motorcycle Company, Springfield, Mass., a corporation of Massachusetts Application November 19, 1930, Serial No. 496,592

12 Claims. (Cl. 180—25)

This invention relates to a convertible motorcycle chassis, that is to say, an arrangement whereby a motorcycle may be quickly and conveniently converted into a motor tricycle, and vice versa.

Heretofore, motorcycles have been equipped with so-called side cars or front devices for transporting passengers or merchandise, but these arrangements greatly detract from the mobility and ready handling which are the principal advantages of the motorcycle.

It is the principal object of this invention to provide an attachment for a motorcycle by which the same may be converted into a motor tricycle of shorter wheel-base than the motorcycle, so that mobility and ready handling are augmented rather than detracted from, and whereby passengers, merchandise, tools or other articles may be transported rapidly and conveniently at small cost.

A further object of this invention is to provide means for converting a standard motorcycle into a motor tricycle, which does not alter the motorcycle in any way, but merely requires removal of the rear wheel for replacement with a two wheeled attachment.

These and other objects of this invention are realized in a preferred embodiment thereof, which includes a pair of clamps secured to the motorcycle frame by means of clips, one of these clamps being attached to the front of the motorcycle frame, and the other being attached to the rear fork, but inside of the same, i. e., forwardly of the normal position of the rear motorcycle wheel, which is first removed.

The front clamp carries a cross bar on the ends of which are mounted side bars whose rear ends are secured to a frame mounted upon the rear clamp, this organization constituting with the motorcycle frame a three-wheeled chassis adapted to be provided with passenger seats, a merchandise box or body, a tool receptacle, or the like, located behind the operator's saddle.

Journalled in adjustable eccentrics mounted in the rear clamp are a pair of oppositely extending stub axles equipped with spaced wheels, and the right-hand axle is provided with a sprocket connected by a chain with the motorcycle engine sprocket. In order to adjust the tension of the driving chain, the eccentric mountings of the axles may be rotated. Thus one of the rear wheels is the driving wheel and the other rear wheel is undriven, but bears the other half of the load at the rear of the vehicle. Suitable springs and a fuel tank complete the organization at the rear of the vehicle.

With this arrangement, it will be seen that an extremely mobile, light, economical and readily handled vehicle is provided, whereby passengers, tools, merchandise, or the like may be transported rapidly, conveniently, and with great ease.

For a better understanding of this invention, reference is made to the accompanying drawings, in which Figure 1 is a side elevation of the convertible motorcycle chassis of this invention;

Fig. 2 is a plan view of the same with certain portions broken away to illustrate the mechanism in greater detail;

Fig. 3 is a rear view of the same; and

Fig. 4 is an enlarged section of the driven axle.

In these drawings, number 10 designates the frame of a standard motorcycle having the front wheel 11, the motor 12 having the driving sprocket 13 and the saddle 14 among the usual equipment.

Clamped by U-bolts 15 to the upper and lower pairs of struts 16 and 17 of the motorcycle frame 10, which extend rearwardly and join to form the rear fork and yokes 18 in which the usual driving wheel is journalled, is a sheet metal housing 19. This housing 19 consists of side webs 20, which lie between the upper and lower struts 16 and 17 at each side of the rear fork; top plate 21, preferably pierced with lightening holes; and bottom plate 22, also pierced with lightening holes.

Side webs 20 of housing 19 are provided with rearward extensions 22', having flanges to render them rigid and connected together at their ends by a tie rod 23.

The housing 19 is also fitted with a pair of inner walls 24, which lie adjacent to and generally conform to the shape of the rear motorcycle fork. These inner walls 24 have upper and lower lateral flanges through which the U-bolts 15 pass, so that these inner walls 24 are secured in place when the housing 19 is mounted upon the rear fork of the motorcycle frame.

As shown particularly in Figs. 1 and 2, a tubular yoke 25 is clamped to the two struts constituting the front yoke of the motorcycle frame. Inserted through this tubular yoke 25 with a forced fit is a tie rod 26 which extends laterally to either side of the motorcycle frame. Slid over the laterally extending ends of the tie rod 26 are spacers 27 which are lengths of pipe whose inner ends abut the opposite sides of yoke 25 and whose outer ends expose the opposite ends of tie rod 26, which are threaded.

Passing over the threaded opposite ends of tie rod 26 and secured thereto by nuts 28 are eyes 29 which are secured in the ends of tubular side bars 30, which extend alongside the motorcycle frame in a rearward direction. The rear ends of these side bars 30 are secured to fittings 31 mounted upon the opposite ends of lower cross tube 32 secured by clamps 33 to the lower struts 17 of the rear fork of motorcycle frame 10.

Secured in clamps 34 mounted upon the upper struts 16 of the rear motorcycle frame fork is an upper cross tube 35, which lies directly above the lower cross tube 32 and is provided with end fittings 36 which are connected to the end fittings 31 of the lower cross tube 32 by the vertical tubes 37.

Each upper cross rod end fitting 36 is provided with a clevis 38 in which is pivoted on pin 39 one end of each of the side rods 40 whose rear ends are connected by rod 41, so that a U-shaped body or platform support is formed which is pivoted at 39. Clamped to side rods 40 adjacent their rear ends are depending rods 42 which are connected to the lower ends of coil springs 43, whose upper ends are secured to the brackets 44 mounted upon the ends of extensions 22′.

As shown particularly in Fig. 4, a cylinder 45 is inserted through aligned apertures in side web 20 and the corresponding inner wall 24 on each side of the housing 19. Each cylinder 45 is provided with integral flanges 46 and 47 which are bolted, riveted, or otherwise secured to the corresponding side web 20 and inner wall 45, respectively.

Each axle housing 48 is eccentrically placed in and formed integrally with a pair of flanged discs 49 rotatably adjustable in cylinder 45, so that the position of the axle 50 relatively to the driving sprocket 13 of the engine 12 may be varied at will.

Each axle 50 is journaled in bearings 51 mounted in the ends of axle housing 48, and the wheels are mounted on the outer ends of the axles. Both rear axles 50 are alike, but the right hand axle, shown particularly in Fig. 4, carries at its inner end the sprocket 52 which is aligned with the sprocket 13 of engine 12 and is connected thereto by chain 53. The other rear axle 50, not being driven, is provided with the spacer 54 in place of the sprocket, so that both of the rear axles 50 may be the same for manufacturing reasons.

The yokes 18 of the rear fork of the motorcycle frame, to which the rear wheel is normally mounted, may be conveniently employed to support a reserve fuel tank 54′. A suitable body 55 may be mounted on the body or platform support consisting of the side and rear rods 40 and 41, this body carrying the rear wheel fenders 56, and comprising either passengers' seats, a merchandise receptacle, a tool box, or the like, depending upon the service in which the vehicle is desired to be placed.

In converting a standard motorcycle into a motor tricycle of short wheel-base by means of the attachments of this invention, the rear wheel of the motorcycle and the driving chain are removed. Then the front yoke 25 is clamped to the front fork of the motorcycle frame, the rear housing 19 is clamped to the struts 16 and 17 of the rear fork of the motorcycle frame by means of U-bolts 15, and the remaining elements and body 55 assembled thereon to complete the vehicle.

In order to properly adjust the driving chain 53 to take up slack or compensate for wear, the right hand eccentrically mounted axle housing 48 is rotated in the corresponding cylinder 45 until the desired adjustment is obtained. Then the left hand axle housing 48 is also rotated in its cylinder 45 to conform to the adjustment of the right hand axle cylinder, in order that both rear wheels will be of the same height relatively to the vehicle chassis. These eccentric mountings of the rear axles may also be employed to vary the clearance of the rear end of the chassis relatively to the road.

It will be seen that the arrangement of this invention provides for the conversion of a standard motorcycle into a motor tricycle which has a shorter wheel-base than that of the original motorcycle, whereby the vehicle may be more readily handled in traffic because of its shorter turning radius, and is generally more mobile than other vehicles. Such a vehicle has many uses such as the delivery of small articles of merchandise, the conveyance of repairmen's tools and spare parts, the transportation of one or more passengers, and many others.

While a preferred embodiment of the invention is illustrated and described herein, it is to be understood that the invention is not limited thereby, but is susceptible of many changes in form and detail within its scope.

We claim:

1. An attachment for converting a motorcycle into a tricycle, comprising in combination a member adapted to be rigidly secured to both the converging upper and lower struts forming the rear fork of the motorcycle frame, opposite wheels therefor located forwardly of the junction of the said converging upper and lower struts, a driving connection between only one of said wheels and the motorcycle engine, and means for adjusting said one wheel relatively to said engine to regulate said driving connection thereto.

2. An attachment for converting a motorcycle into a motor tricycle, comprising in combination a member adapted to be rigidly secured to both the converging upper and lower struts forming the rear fork of the motorcycle frame, opposite wheels therefor located forwardly of the junction of the said converging upper and lower struts, a driving connection between one of said wheels and the motorcycle engine, and means for adjusting said wheels independently of each other relatively to said member to vary the road clearance of the vehicle.

3. An attachment for converting a motorcycle into a motor tricycle, comprising in combination a member adapted to be rigidly secured to both the converging upper and lower struts forming the rear fork of the motorcycle frame, a rear axle located between the said upper and lower struts, driving connections between the motorcycle engine and said rear axle, and a support for said axle mounted eccentrically on said member, whereby the position of said axle may be varied at will.

4. An attachment for converting a motorcycle into a motor tricycle, comprising in combination a member adapted to be secured to the converging upper and lower struts forming the rear fork of the motorcycle frame, aligned eccentrics journalled in opposite sides of said member, a stub axle mounted on each of said eccentrics, and wheels mounted on said axles, said eccentrics being independently rotatable to vary the position of said axles relatively to the other parts of the vehicle.

5. An attachment for converting a motorcycle into a motor tricycle, comprising in combination a member adapted to be secured to the converging upper and lower struts forming the rear fork of the motorcycle frame, a rear wheel and axle combination mounted on said member, a sprocket for said wheel and axle combination, a chain connecting said sprocket with the sprocket of the motorcycle engine, and eccentric means for adjusting said wheel and axle combination relatively to said member to regulate the tension of said chain.

6. An attachment for converting a motorcycle into a motor tricycle, comprising in combination a member adapted to be secured to the converging upper and lower struts forming the rear fork of the motorcycle frame, wheels therefor, a second frame mounted on the motorcycle frame adjacent said member, a body support mounted upon one of said frames, and springs at least partially supporting said body support.

7. An attachment for converting a motorcycle into a motor tricycle, comprising in combination a member adapted to be secured to the rear fork of the motorcycle frame, opposite wheels therefor, a second frame mounted on the motorcycle frame adjacent said member, a body support pivoted at one side on said second frame, and a spring supporting another side of said body support.

8. An attachment for converting a motorcycle into a motor tricycle, comprising in combination a member adapted to be secured to the converging upper and lower struts forming the rear fork of the motorcycle frame, opposite wheels therefor, a second frame secured to said motorcycle frame, a body support pivoted at one side to the second frame, and a spring between the opposite side of said support and said member.

9. An attachment for converting a motorcycle into a motor tricycle, comprising in combination a member adapted to be secured to the rear fork of the motorcycle frame, opposite wheels therefor, a chassis frame secured to the motorcycle frame, a body support pivoted on said chassis frame, and springs between said body support and said member.

10. An attachment for converting a motorcycle into a motor tricycle, comprising in combination a member adapted to be secured to the converging upper and lower struts forming the rear fork of the motorcycle frame, opposite wheels therefor, a chassis frame secured to the motorcycle frame, and a body support flexibly mounted thereon and extending rearwardly between said wheels.

11. An attachment for converting a motorcycle into a motor tricycle, comprising in combination a member adapted to be rigidly secured to and between the converging upper and lower struts forming the rear fork of the motorcycle frame and extending laterally therefrom to form a chassis, a pair of wheels mounted on the member forwardly of the junction of the said converging upper and lower struts, driving connections between the wheels and the engine of the motorcycle, and extensions on the member extending forwardly along either side of the motorcycle frame and secured thereto at their forward ends.

12. An attachment for converting a motorcycle into a motor tricycle, comprising a member adapted to be secured to each pair of the converging upper and lower struts forming the rear fork of the motorcycle frame, lateral extensions thereon, side webs mounted on the outer ends of said extensions, a stub axle journalled in each extension and extending from the member through the corresponding side web on each side of the motorcycle frame, a wheel on each axle, and a driving connection between one of said axles and the engine of the motorcycle.

ELEUTHERE PAUL DU PONT.
GEO. BRIGGS WEAVER.